US007437562B2

(12) United States Patent
Philips et al.

(10) Patent No.: US 7,437,562 B2
(45) Date of Patent: Oct. 14, 2008

(54) METHOD AND APPARATUS FOR DIGITALLY SIGNING ELECTRONIC MAIL THAT ORIGINATES FROM A BROWSER

(75) Inventors: Andrew B. Philips, San Francisco, CA (US); Ramana Rao Turlapati, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 809 days.

(21) Appl. No.: 10/405,431

(22) Filed: Apr. 1, 2003

(65) Prior Publication Data

US 2004/0199761 A1 Oct. 7, 2004

(51) Int. Cl.
  *H04L 9/00* (2006.01)
(52) U.S. Cl. ............... 713/176; 713/153; 713/152; 709/207; 709/206
(58) Field of Classification Search ......... 713/152–153, 713/176; 709/207, 206
  See application file for complete search history.

(56) References Cited

U.S. PATENT DOCUMENTS

| | | | | |
|---|---|---|---|---|
| 6,161,181 A | * | 12/2000 | Haynes et al. | 713/170 |
| 6,986,037 B1 | * | 1/2006 | Assmann | 713/155 |
| 7,203,838 B1 | * | 4/2007 | Glazer et al. | 713/176 |
| 2002/0032861 A1 | * | 3/2002 | Azuma | 713/170 |
| 2002/0165827 A1 | * | 11/2002 | Gien et al. | 705/64 |
| 2003/0217259 A1 | * | 11/2003 | Wong et al. | 713/153 |
| 2005/0050317 A1 | * | 3/2005 | Kramer et al. | 713/155 |

* cited by examiner

*Primary Examiner*—Nasser Moazzami
*Assistant Examiner*—Fikremariam Yalew
(74) *Attorney, Agent, or Firm*—Park, Vaughan & Fleming LLP; Edward J. Grundler

(57) ABSTRACT

One embodiment of the present invention provides a system for digitally signing electronic mail that originates from a browser. The system operates by first receiving a message from a browser at a mail server. The mail server formats the message and returns the formatted message to the browser so that the browser can sign the message. The mail server then receives the signature for the formatted message from the browser and encapsulates the formatted message and the signature into a secure message. Next, the mail server forwards the secure message to the intended recipients for the message.

20 Claims, 3 Drawing Sheets

METHOD AND APPARATUS FOR DIGITALLY SIGNING ELECTRONIC MAIL THAT ORIGINATES FROM A BROWSER

BACKGROUND

1. Field of the Invention

The present invention relates to electronic mail. More specifically, the present invention relates to a method and an apparatus for digitally signing electronic mail that originates from a web browser.

2. Related Art

In addition to providing an effective means of communication, people are beginning to use electronic mail for other purposes, such as consummating business transactions. To provide an effective medium for business transactions, electronic mail needs to be signed in a manner that makes it possible to verify the source of the electronic mail and that facilitates non-repudiation of electronic mail messages.

Existing applications that send and receive electronic mail sometimes include cryptographic processes for embedding digital signatures within the email message. These applications typically use a mail format known as Secure Multipurpose Internet Mail Extensions (S/MIME) to encapsulate a number of items including, the message, addressing information, digital signatures, and other information related to the electronic mail message. While this system works well when the electronic messages originate from and are delivered to electronic mail applications, there are many situations in which generating an S/MIME formatted message is not possible or presents security problems.

Problems can arise while accessing electronic mail from a remote location, because such access may be prohibited by corporate firewalls or may be restricted by other means. In these cases, users can retrieve their electronic mail from a web mail server through a web browser. While a web browser can access the web mail server to perform a number of functions, such as displaying messages, replying to messages, and initiating new messages, existing web browsers do not have the capability to create an S/MIME formatted message. The web mail server typically formats and deformats electronic mail messages for the web browser using the Multipurpose Internet Mail Extensions (MIME) standard.

A web mail server can be programmed to generate S/MIME messages. However, this creates security problems. In order for the web mail server to be able to sign the message, the web mail server needs to know the signer's private key. If the signer's private key is available to an application such as the web mail server, the signature cannot be traced reliably to the user. Therefore, the user can deny signing a message and there would be no proof to indicate otherwise.

Hence, what is needed is a method and an apparatus for digitally signing browser electronic mail without the problems described above.

SUMMARY

One embodiment of the present invention provides a system for digitally signing electronic mail that originates from a browser. The system operates by first receiving a message from a browser at a mail server. The mail server formats the message and returns the formatted message to the browser so that the browser can sign the message. The mail server then receives the signature for the formatted message from the browser and encapsulates the formatted message and the signature into a secure message. Next, the mail server forwards the secure message to the intended recipients for the message.

In a variation of this embodiment, the browser signs the message using a private key that is part of a private key/public key pair.

In a further variation, the browser signs the message using public key cryptography standard seven (PKCS7).

In a further variation, the mail server forwards the secure message to a standard mail server, which can include a simple mail transfer protocol (SMTP) server or an Internet mail access protocol (IMAP) server. The standard mail server recognizes the secure message as valid.

In a further variation, the message format includes a Multipurpose Internet Mail Extensions (MIME) format and the secure message includes a Secure MIME (S/MIME) format.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer Systems

Figure 1:
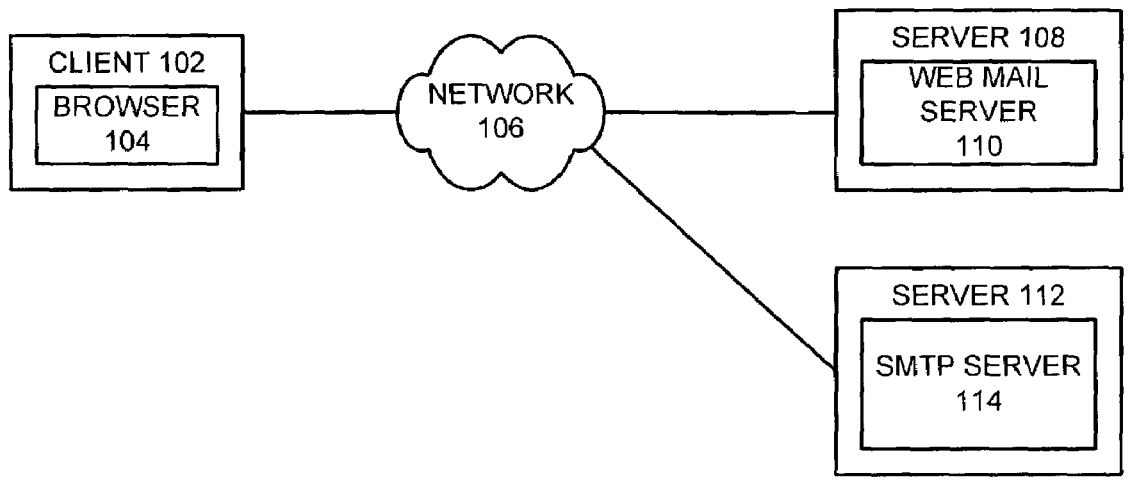
FIG. 1 illustrates computer systems coupled together in accordance with an embodiment of the present invention.

FIG. 1 illustrates computer systems coupled together in accordance with an embodiment of the present invention. Client 102 and servers 108 and 112 are coupled to and communicate across network 106. Client 102 can generally include any node on a network including computational capability and including a mechanism for communicating across network 106. Client 102 includes browser 104. Browser 104 can generally include any type of web browser capable of viewing a web site, such as the INTERNET EXPLORER™ browser distributed by the Microsoft Corporation of Redmond, Wash.

Servers 108 and 112 can generally include any nodes on a computer network including a mechanism for servicing requests from a client for computational and/or data storage resources. Server 108 includes web mail server 110 and server 112 includes SMTP server 114.

Network 106 can generally include any type of wire or wireless communication channel capable of coupling together computing nodes. This includes, but is not limited to, a local area network, a wide area network, or a combination of networks. In one embodiment of the present invention, network 106 includes the Internet.

During operation, browser 104 generates an electronic mail message to be digitally signed and sent to a recipient that uses SMTP server 114. Browser 104 sends the electronic mail message and a signature request to web mail server 110 specifying that the message is to be formatted as a Secure Multipurpose Internet Mail Extensions (S/MIME) message.

In response, web mail server 110 formats the message, including source address, destination addresses, and other data in a MIME format to be digitally signed. Web mail server 110 then returns the message in MIME format back to browser 104 for a digital signature. Note that returning the MIME format message to browser 104 for signature allows client 102 to maintain control over the cryptographic keys used to form the signature while web mail server 110 ensures that the electronic mail message is properly formatted. Also note that browser 104 does not include the means for formatting the message.

After browser 104 has signed the message, the signature is returned to web mail server 110 to be added to the MIME formatted message to create an S/MIME formatted message. This S/MIME formatted message is then sent to SMTP server 114 for delivery to the recipient. Note that the S/MIME formatted message is indistinguishable from an S/MIME message created by a normal SMTP server. Also note that an Internet mail access protocol (IMAP) server can be used in place of the SMTP server.

Web Mail Server

Figure 2:
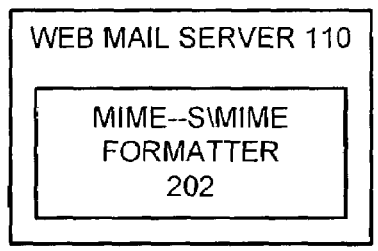
FIG. 2 illustrates web mail server 110 in accordance with an embodiment of the present invention.

FIG. 2 illustrates web mail server 110 in accordance with an embodiment of the present invention. Web mail server 110 includes MIME—S/MIME formatter 202. During operation, MIME—S/MIME formatter 202 receives an electronic mail message, including header information, from browser 104. In response, MIME—S/MIME formatter 202 formats the electronic mail message into a MIME format and returns the formatted message to browser 104. After browser 104 returns the signature for the formatted message, MIME—S/MIME formatter 202 formats the MIME message and signature as an S/MIME message. This S/MIME message is indistinguishable from an S/MIME message generated by a normal SMTP server or a normal IMAP server.

Browser

Figure 3:
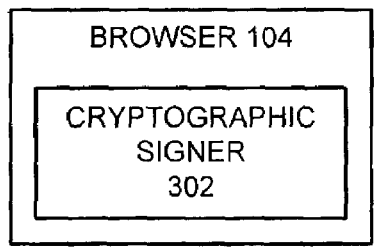
FIG. 3 illustrates browser 104 in accordance with an embodiment of the present invention.

FIG. 3 illustrates browser 104 in accordance with an embodiment of the present invention. Browser 104 includes cryptographic signer 302. Cryptographic signer 302 digitally signs MIME messages formatted for signature and returned by MIME—S/MIME formatter 202. Cryptographic signer 302 typically uses a private key belonging to a user of client 102 to digitally sign the MIME message. The user's public key can then be used by message recipients to prove that the user signed the MIME message. In one embodiment of the present invention, cryptographic signer 302 uses public key cryptography standard seven (PKCS7) to sign the electronic mail message.

Message Flow

Figure 4:
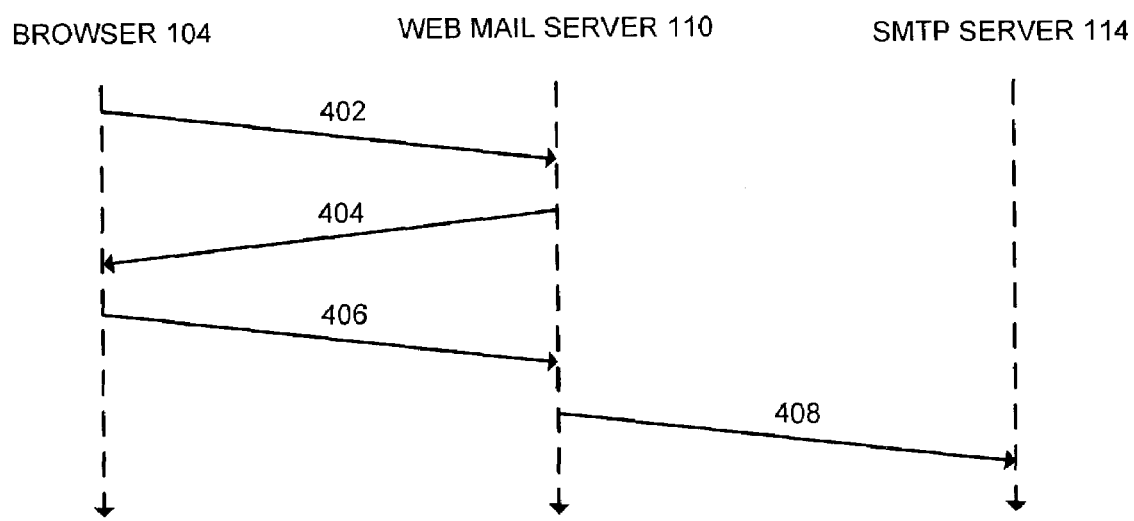
FIG. 4 presents an activity diagram illustrating message flow in accordance with an embodiment of the present invention.

FIG. 4 presents an activity diagram illustrating message flow in accordance with an embodiment of the present invention. Browser 104 generates electronic mail message 402 and sends electronic mail message 402 to web mail server 110. Web mail server 110 formats electronic mail message 402 into MIME message 404 and returns MIME message 404 to browser 104.

Next, browser 104 signs the MIME message and returns signature 406 to web mail server 110. Web mail server 110 then formats the MIME message and signature 406 as S/MIME message 408 and forwards S/MIME message 408 to SMTP server 114 for delivery to the intended recipients for the message.

Digitally Signing Browser Electronic Mail

Figure 5:
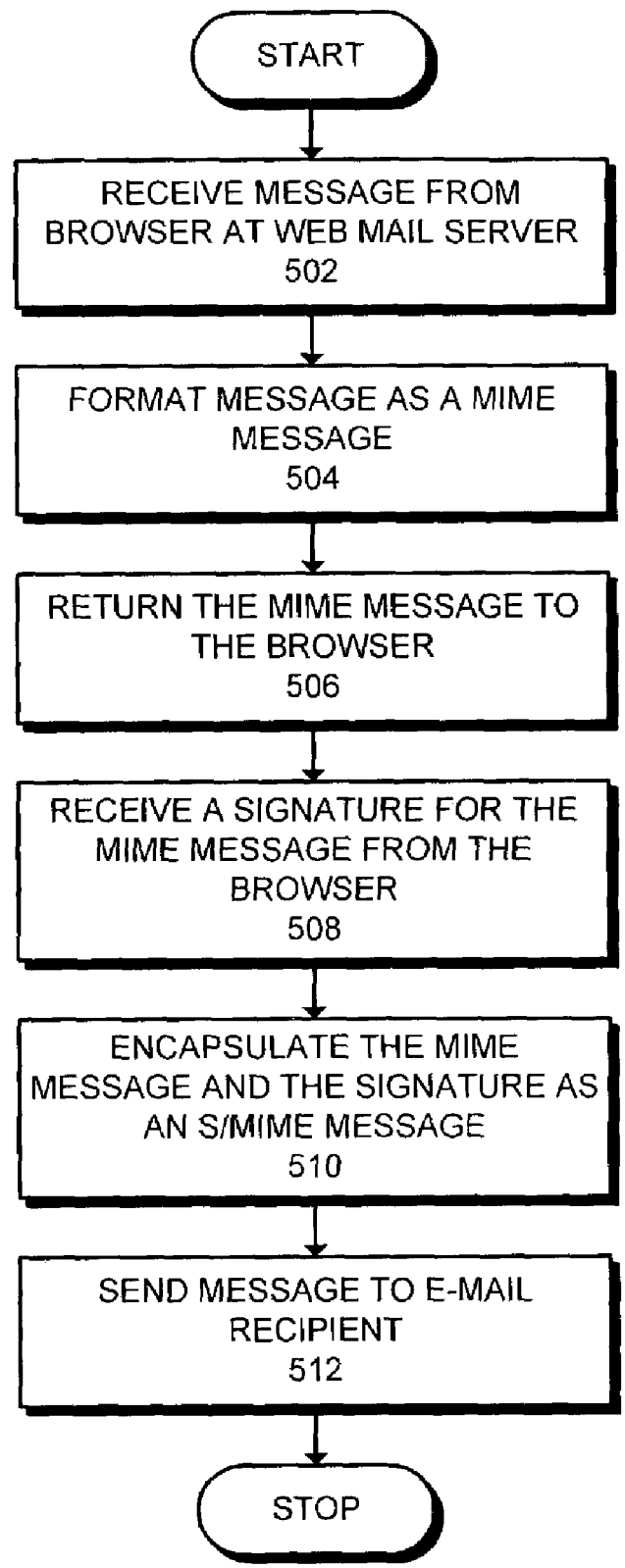
FIG. 5 presents a flowchart illustrating the process of digitally signing browser electronic mail in accordance with an embodiment of the present invention.

FIG. 5 presents a flowchart illustrating the process of digitally signing browser electronic mail in accordance with an embodiment of the present invention. The system starts when the web mail server receives an electronic mail message from a browser (step 502). Next, the system formats the message as a MIME message (step 504). After formatting the message as a MIME message, the system returns the MIME message to the browser for signature (step 506). Note that for simple electronic mail messages (no attachments, not encrypted, etc.), one embodiment of the present invention allows formatting the message as a MIME message at the browser. In this case, steps 502 and 506 are not necessary and step 504 is executed at the browser.

In response to returning the MIME message to the browser, the web mail server receives a signature for the MIME message from the browser (step 508). Next, the system encapsulates the MIME message and the signature as an S/MIME message (step 510). Finally, the system sends the S/MIME message to the recipient (step 512).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for digitally signing electronic mail that originates from a web browser, comprising:

receiving at a remote mail server content for an electronic mail message and a signature request from the web browser of a client, wherein the web browser does not include a mechanism for formatting the message into an electronic mail format;

formatting the electronic mail message at the remote mail server to a format that can be digitally signed;

returning the formatted electronic mail message to the web browser of the client so that the web browser of the client can generate a digital signature for the formatted electronic mail message, wherein returning the formatted message to the web browser of the client allows the client to maintain control over cryptographic keys used for the signature receiving at the remote mail server a signature for the formatted electronic mail message from the web browser of the client;

encapsulating at the remote mail server the formatted electronic mail message and the signature as a secure electronic mail message; and forwarding the secure electronic mail message to intended recipients.

2. The method of claim 1, wherein the browser signs the message using public key cryptography.

3. The method of claim 2, wherein the browser signs the message using public key cryptography standard seven (PKCS7).

4. The method of claim 1, further comprising sending the secure message to a standard mail server, wherein the standard mail server includes one of a simple mail transfer protocol (SMTP) server and an Internet mail access protocol (IMAP) server, whereby the standard mail server recognizes the secure message as valid.

5. The method of claim 1,
wherein the message format includes a Multipurpose Internet Mail Extensions (MIME) format; and
wherein the secure message includes a Secure MIME (S MIME) format.

6. A computer-readable storage medium storing instructions that when executed by a computer cause the computer to perform a method for digitally signing electronic mail that originates from a web browser, the method comprising:
receiving at a remote mail server content for an electronic mail message and a signature request from the web browser of a client, wherein the web browser does not include a mechanism for formatting the message into an electronic mail format;
formatting the electronic mail message at the remote mail server to a format that can be digitally signed;
returning the formatted electronic mail message to the web browser of the
client so that the web browser of the client can generate a digital signature for the
formatted electronic mail message, wherein returning the formatted message to the web browser of the client allows the client to maintain control over cryptographic keys used for the signature;
receiving at the remote mail server a signature for the formatted electronic mail message from the web browser of the client;
encapsulating at the remote mail server the formatted electronic mail message and the signature as a secure electronic mail message; and
forwarding the secure electronic mail message to intended recipients.

7. The computer-readable storage medium of claim 6, wherein the browser signs the message using public key cryptography.

8. The computer-readable storage medium of claim 7, wherein the browser signs the message using public key cryptography standard seven (PKCS7).

9. The computer-readable storage medium of claim 6, the method further comprising sending the secure message to a standard mail server, wherein the standard mail server includes one of a simple mail transfer protocol (SMTP) server and an Internet mail access protocol (IMAP) server, whereby the standard mail server recognizes the secure message as valid.

10. The computer-readable storage medium of claim 6,
wherein the message format includes a Multipurpose Internet Mail Extensions (MIME) format; and
wherein the secure message includes a Secure MIME (S MIME) format.

11. A method for digitally signing electronic mail that originates from a web browser, comprising:
receiving at a remote mail server content for an electronic mail message and a signature request from the web browser of a client, wherein the web browser does not include a mechanism for formatting the message into an electronic mail format;
operating on the electronic mail message at the remote mail server to generate data that can be digitally signed;
returning the data to the web browser of the client so that the web browser of the client can generate a digital signature for the data, wherein returning the data to the web browser of the client allows the client to maintain control over cryptographic keys used for the signature;
receiving at the remote mail server a signature for the digitally signed data from the web browser of a client;
encapsulating at the remote mail server the electronic mail message and the signature as a secure electronic mail message; and
forwarding the secure electronic mail message to intended recipients.

12. The method of claim 11, wherein the browser signs the data using public key cryptography.

13. The method of claim 12, wherein the browser signs the data using public key cryptography standard seven (PKCS7).

14. The method of claim 11, further comprising sending the secure message to a standard mail server, wherein the standard mail server includes one of a simple mail transfer protocol (SMTP) server and an Internet mail access protocol (IMAP) server, whereby the standard mail server recognizes the secure message as valid.

15. The method of claim 11,
wherein the message format includes a Multipurpose Internet Mail Extensions (MIME) format; and
wherein the secure message includes a Secure MIME (S MIME) format.

16. A computer-readable storage medium storing instructions that when executed by a computer cause the computer to perform a method for digitally signing electronic mail that originates from a web browser, the method comprising:
receiving at a remote mail server content for an electronic mail message and a signature request from the web browser of a client, wherein the web browser does not include a mechanism for formatting the electronic mail message into an electronic mail format;
operating on the electronic mail message at the remote mail server to generate data that can be digitally signed;
returning the data to the web browser of the client so that the web browser of the client can generate a digital signature for the data, wherein returning the data to the web browser of the client allows the client to maintain control over cryptographic keys used for the signature;
receiving at the remote mail server a signature for the digitally signed data from the web browser of a client;
encapsulating at the remote mail server the electronic mail message and the signature as a secure electronic mail message; and
forwarding the secure electronic mail message to intended recipients.

17. The computer-readable storage medium of claim 16, wherein the browser signs the data using public key cryptography.

18. The computer-readable storage medium of claim 17, wherein the browser signs the data using public key cryptography standard seven (PKCS7).

19. The computer-readable storage medium of claim 16, the method further comprising sending the secure message to a standard mail server, wherein the standard mail server includes one of a simple mail transfer protocol (SMTP) server and an Internet mail access protocol (IMAP) server, whereby the standard mail server recognizes the secure message as valid.

20. The computer-readable storage medium of claim 16, wherein the message format includes a Multipurpose Internet Mail Extensions (MIME) format; and wherein the secure message includes a Secure MIME (S MIME) format.

* * * * *

UNITED STATES PATENT AND TRADEMARK OFFICE
CERTIFICATE OF CORRECTION

PATENT NO. : 7,437,562 B2
APPLICATION NO. : 10/405431
DATED : October 14, 2008
INVENTOR(S) : Philips et al.

It is certified that error appears in the above-identified patent and that said Letters Patent is hereby corrected as shown below:

On sheet 1 of 3, in Figure 3, Ref. Numeral 202, line 1, delete "S\MIME" and insert -- S/MIME --, therefor.

In column 4, line 61, in claim 1, delete "signature" and insert -- signature; --, therefor.

In column 5, line 17-18, in claim 5, delete "(S MIME)" and insert -- (S/MIME) --, therefor.

In column 5, line 62-63, in claim 10, delete "(S MIME)" and insert -- (S/MIME) --, therefor.

In column 6, line 35-36, in claim 15, delete "(S MIME)" and insert -- (S/MIME) --, therefor.

In column 8, line 4-5, in claim 20, delete "(S MIME)" and insert -- (S/MIME) --, therefor.

Signed and Sealed this

Twentieth Day of April, 2010

David J. Kappos
*Director of the United States Patent and Trademark Office*